(12) United States Patent
Zhang et al.

(10) Patent No.: US 10,844,788 B2
(45) Date of Patent: Nov. 24, 2020

(54) FUEL ADDITIVE INJECTION SYSTEM AND METHODS FOR INHIBITING COKE FORMATION

(71) Applicant: General Electric Company, Schenectady, NY (US)

(72) Inventors: Hua Zhang, Greer, SC (US); David Terry Trayhan, Jr., Greenville, SC (US); William James Lawson, Niskayuna, NY (US); Paul Burchell Glaser, Greenville, SC (US); Douglas Frank Beadie, Greer, SC (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 15/626,884

(22) Filed: Jun. 19, 2017

(65) Prior Publication Data
US 2018/0363552 A1    Dec. 20, 2018

(51) Int. Cl.
| F02C 3/30 | (2006.01) |
| F02C 7/22 | (2006.01) |
| F02C 7/30 | (2006.01) |
| F02C 3/24 | (2006.01) |
| B23P 15/04 | (2006.01) |

(52) U.S. Cl.
CPC .................. *F02C 3/30* (2013.01); *F02C 3/24* (2013.01); *F02C 7/22* (2013.01); *F02C 7/30* (2013.01); *B23P 15/04* (2013.01); *F05D 2260/601* (2013.01)

(58) Field of Classification Search
CPC ...... F02C 3/30; F02C 7/22; F02C 7/30; F05D 2260/607; F23K 5/10; F23K 5/12; F23K 2301/103
See application file for complete search history.

(56) References Cited

U.S. PATENT DOCUMENTS

| 4,696,638 | A | * | 9/1987 | Denherder | .............. C10L 1/328 431/4 |
| 5,344,306 | A | * | 9/1994 | Brown | ..................... C10L 1/328 431/4 |
| 6,079,198 | A | * | 6/2000 | Prowse | .................... F02C 7/228 60/734 |
| 2010/0242490 | A1 | | 9/2010 | Symonds | |

(Continued)

FOREIGN PATENT DOCUMENTS

WO    2016162718 A1    10/2016

*Primary Examiner* — Scott J Walthour
(74) *Attorney, Agent, or Firm* — Armstrong Teasdale LLP

(57) ABSTRACT

A turbine engine comprising includes at least one combustor, a liquid fuel supply system, and a fuel additive injection system. The combustor is configured to combust liquid fuel. The liquid fuel supply system is configured to channel liquid fuel through at least one fuel line to the at least one combustor. The fuel additive injection system is coupled in fluid communication with the liquid fuel supply system. The fuel additive injection system includes a recirculation circuit configured to recirculate at least a portion of liquid fuel to the liquid fuel supply system. The fuel additive injection system is configured to channel chemical additive through the recirculation circuit for mixing with the at least a portion of liquid fuel to generate an additive fuel mixture configured to inhibit coke formation in the liquid fuel supply system.

18 Claims, 4 Drawing Sheets

(56) References Cited

U.S. PATENT DOCUMENTS

2010/0307158 A1\* 12/2010 Bilton ................... F02C 7/224
60/736
2011/0100015 A1 5/2011 Alagappan et al.
2011/0126545 A1\* 6/2011 Loeven, II ............... F02C 7/22
60/772
2015/0030947 A1\* 1/2015 Saunders .......... H01M 8/04022
429/415

\* cited by examiner

FUEL ADDITIVE INJECTION SYSTEM AND METHODS FOR INHIBITING COKE FORMATION

BACKGROUND

The embodiments described herein relate generally to a liquid fuel supply system for a gas turbine engine and, more particularly, to a fuel additive injection system for injecting a chemical additive into the liquid fuel supply system.

At least some known gas turbine engines use a gaseous fuel and liquid fuel for operation. For example, the gas turbine engines may use the liquid fuel when the gaseous fuel is unavailable or is undesirable. When a gas turbine engine is operating on the gaseous fuel, the parallel liquid fuel supply system may store a portion of the liquid fuel in the fuel lines, for example in standby mode. The liquid fuel supply system includes, for example, a plurality of fuel lines and valves filled with the liquid fuel for use when necessary or desired.

With at least some known gas turbine engines, during combustion of the gaseous fuel produces increased temperatures in the combustors and in an area adjacent the combustors, including an area having a portion of the liquid fuel supply system. As such, the portion of the liquid fuel supply system is increased in temperature. The increased temperature of the liquid fuel supply system adjacent the combustors may result in oxidation and/or partial decomposition of the liquid fuel in the liquid fuel supply system, thereby producing coke in the fuel lines and/or valves. This process is referred to as "coking." Coking results in hard deposits being formed in the liquid fuel supply system, which may clog and/or foul the associated fuel lines and valves. Coking may interfere with the channeling of the liquid fuel transfer through the liquid fuel supply system, and can require shut down of the gas turbine engine.

At least some known gas turbine engines recirculate the liquid fuel in the liquid fuel supply system to prevent the fuel from becoming stagnant and susceptible to coking. In addition, some known gas turbine engines flush the fuel lines of the liquid fuel supply system during operation of the gas turbine engine on the gaseous fuel. For example, the liquid fuel lines may be flushed with a liquid, such as water, and/or a gas, such as nitrogen. The remaining liquid and/or gas may be drained from the liquid fuel lines. Flushing the fuel lines, however, can require hardware changes to the liquid fuel system. In other known gas turbine engines, the bulk fuel may be mixed an additive. Such systems, however, are not part of the control sequence of the turbine engine and may require substantial retrofit costs and down time to incorporate such systems. In addition, at least some known systems treat the bulk fuel upstream of the stop valve for the gas turbine engine, thus potentially leaving the fuel untreated in a trip of the gas turbine engine.

BRIEF DESCRIPTION

In one aspect, a turbine engine is provided. The turbine engine includes at least one combustor configured to combust liquid fuel. In addition, the turbine engine includes a liquid fuel supply system configured to channel liquid fuel through at least one fuel line to the at least one combustor. Moreover, the turbine engine includes a fuel additive injection system couple in fluid communication with the liquid fuel supply system. The fuel additive injection system includes a recirculation loop configured to recirculate at least a portion of liquid fuel to the liquid fuel supply system. The fuel additive injection system is configured to channel chemical additive through the recirculation loop for mixing with the at least a portion of liquid fuel to generate an additive fuel mixture configured to inhibit coke formation in the liquid fuel supply system.

In another aspect, a liquid fuel supply system is provided. The liquid fuel supply system includes a stop valve, a liquid fuel pump coupled downstream and in fluid communication with the stop valve, and a control valve coupled downstream and in fluid communication with the liquid fuel pump. The liquid fuel pump is configured to channel liquid through the liquid fuel supply system downstream of the stop valve. In addition, the liquid fuel supply system includes a fuel additive injection system having a recirculation loop configured to recirculate at least a portion of liquid fuel to the liquid fuel supply system. The recirculation loop includes a first fluid line coupled in flow communication with the control valve and a second fluid line coupled in fluid communication with and between the stop valve and the liquid fuel pump. The fuel additive injection system channels chemical additive through the recirculation loop for mixing with the at least a portion of liquid fuel to generate an additive fuel mixture configured to inhibit coke formation in the liquid fuel supply system.

In another aspect, a method for inhibiting coke formation in a liquid fuel supply system is provided. The method includes channeling a flow of a portion of liquid fuel through a control valve positioned in a main fuel line of the liquid fuel supply system into a recirculation loop of a fuel additive injection system. The control valve is located downstream of a stop valve of the liquid fuel supply system. The method also includes channeling a flow of a chemical additive through a chemical additive valve into the recirculation loop. Furthermore, the method includes mixing the flow of a chemical additive with the flow of a portion of liquid fuel in the fuel additive injection system to generate a flow of an additive fuel mixture configured to inhibit coke formation in the liquid fuel supply system. Moreover, the method includes channeling the flow of an additive fuel mixture into the main fuel line of the liquid fuel supply system upstream of the control valve and downstream of the stop valve.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
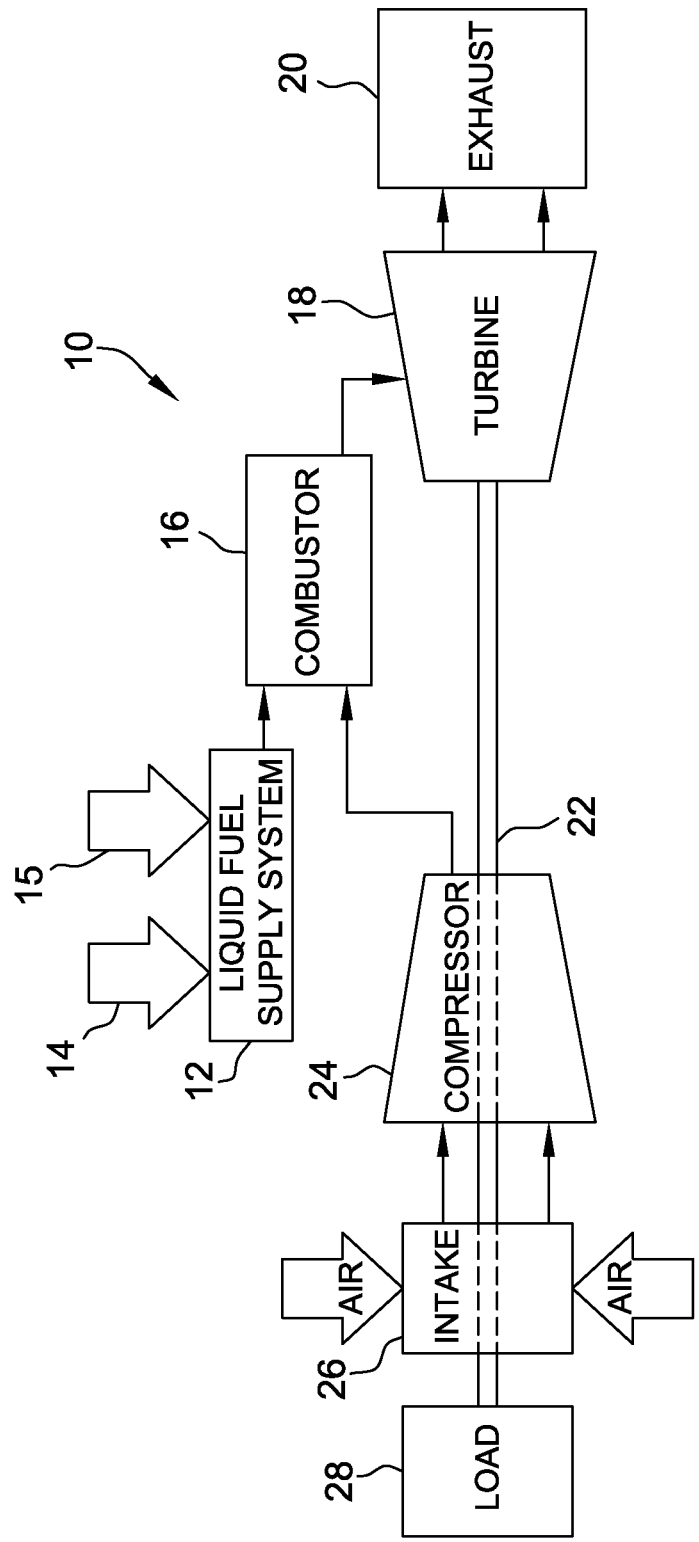
FIG. 1 is a schematic diagram of an exemplary dual-fuel turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The exemplary components and methods described herein overcome at least some of the disadvantages associated with known liquid fuel supply systems for gas turbine engines, and in particular gaseous fuel/liquid fuel turbine engines ("dual-fuel turbine engines"). The embodiments described herein include a fuel additive injection system for inhibiting coke formation in the liquid fuel supply systems for the dual-fuel turbine engines. As described herein, the fuel additive injection system is in fluid communication with the liquid fuel supply system of one or more combustors to facilitate inhibiting coke formation in the liquid fuel supply system. The fuel additive injection system provides a chemical additive that is mixed with the liquid fuel to facilitate inhibiting coke formation within the liquid fuel supply system. The chemical additive may be referred to as an anti-fouling or an anti-coking agent. The chemical additive includes, for example, and without limitation, a mixture of at least one of the following: an antioxidant, a polymer inhibitor, and a metal deactivator. The fuel additive injection system includes a chemical additive tank that contains the chemical additive, a chemical additive injection device, such as a pump or an ejector, and a controller configured to control the supply of the chemical additive to the liquid fuel supply system.

FIG. 1 is a schematic diagram of an exemplary dual-fuel turbine engine 10. In the exemplary embodiment, turbine engine 10 uses a liquid fuel, such as heavy fuel oil, kerosene, naphtha, condensates, and other liquid fuels, or a gaseous fuel, such as natural gas, to operate. Turbine engine 10 includes a liquid fuel supply system 12 is configured to provide liquid fuel to a combustor 16. Liquid fuel supply system 12 receives a liquid fuel 14 from a fuel source 104 (not shown in FIG. 1). In some embodiments, one or more fuel nozzles may receive liquid fuel 14 and one or more other fuel nozzles may be used to receive a gaseous fuel (not shown). In the exemplary embodiment, liquid fuel supply system 12 is also configured to receive a chemical additive 15 from a fuel additive injection system 100 (not shown in FIG. 1), for example, when turbine engine 10 is operating on liquid fuel 14. Chemical additive 15 may be used and/or available from a chemical additive source 102 (not shown in FIG. 1) available, for example, in a power plant associated with turbine engine 10. For example, and without limitation, chemical additive 15 is added to liquid fuel 14 to facilitate inhibiting and/or reducing coking of liquid fuel 14.

In the exemplary embodiment, turbine engine 10 mixes fuel 14 with chemical additive 15 within liquid fuel supply system 12. Mixing fuel 14 with chemical additive 15 facilitates channeling the additive fuel mixture through one or more fuel lines and/or valves (not shown in FIG. 1) of the liquid fuel supply system 12 adjacent combustors 16, thereby facilitating reducing coking within the fuels lines and/or valves. In the exemplary embodiment, liquid fuel 14 and/or liquid fuel 14 and chemical additive 15, and air is combusted (or burned) in combustor 16, generating hot pressurized gases (not shown). Combustor 16 channels the gases through a turbine 18 and toward an exhaust outlet 20. While turbine engine 10 is illustrated with one combustor 16, it is noted that turbine engine 10 typically includes a plurality of combustors 16 arranged circumferentially, or in an annular arrangement, around turbine engine 10.

In the exemplary embodiment, each combustor 16 includes one or more separate fuel nozzles (not shown). As the combusted gases pass through turbine 18, the gases force turbine blades (not shown) to rotate a shaft 22 along an axis of turbine engine 10. Shaft 22 is connected to various components of turbine engine 10, including, for example, and without limitation, a compressor 24. Compressor 24 includes a plurality of blades (not shown) coupled to shaft 22. As the shaft 22 rotates, compressor 24 also rotates, thereby compressing air from an air intake 26 and channeling the compressed air through the compressor 24 and into fuel nozzles and/or combustor 16. In some embodiments, shaft 22 is coupled to a load 28, which can include, for example, and without limitation, a vehicle or a stationary load, such as, for example, and without limitation, an electrical generator or a propeller on an aircraft. Alternatively, load 28 includes any suitable component capable of being powered by the rotational output of turbine engine 10.

As described above, coke formation can negatively impact the operation of turbine engine 10. For example, coke formation can reduce the flow area of the liquid fuel lines. In addition, coke formation can harden over time and cause one or more valves in liquid fuel supply system 12 to seize. Fragments of coke can flake off the fuel line surfaces, flow through open valves, and choke the fuel nozzles in combustors 16. As such, coke formation can lead to uneven distribution of liquid fuel 14 in combustors 16, which can result in tripping of turbine engine 10. Fuel additive injection system 100 is configured to facilitate inhibiting the formation of coke within liquid fuel supply system 12 by mixing chemical additive 15 with liquid fuel 14 in liquid fuel supply system 12. Chemical additive 15 is configured to substantially inhibit or reduce the formation of coke caused by the combined presence of stagnant liquid fuel 14, air, heat, and metal in liquid fuel supply system 12. As such, fuel additive injection system 100 facilitates improving the reliability and efficiency of turbine engine 10. In addition, the operating and maintenance costs of turbine engine 10 are reduced.

Figure 2:
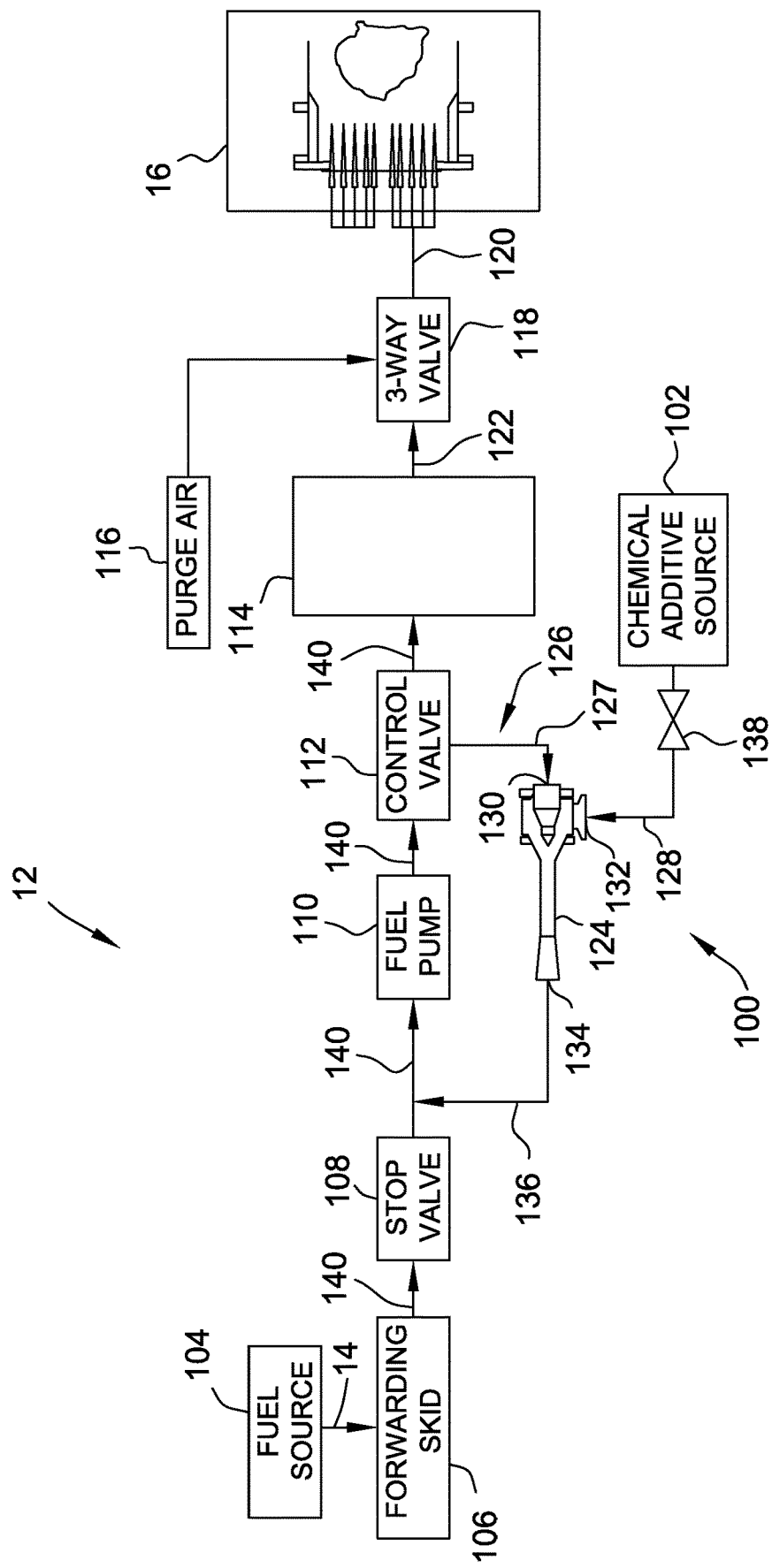
FIG. 2 is a schematic diagram of a liquid fuel supply system for use with the turbine engine shown in FIG. 1.

FIG. 2 is a schematic diagram of liquid fuel supply system 12 for use with turbine engine 10 (shown in FIG. 1). In the exemplary embodiment, liquid fuel supply system 12 includes fuel additive injection system 100 in fluid communication with liquid fuel supply system 12. Liquid fuel 14 flows into liquid fuel supply system 12 from a liquid fuel forwarding skid 106. During liquid fuel operation of turbine engine 10, a stop valve 108 positioned between forwarding skid 106 and a liquid fuel pump 110 is opened, and liquid fuel 14 is channeled to liquid fuel pump 110. Liquid fuel pump 110 generates a positive fuel flow through a control valve 112 and into a fuel flow divider 114. In the exemplary embodiment, fuel flow divider 114 is configured to divide liquid fuel 14 into a plurality of fuel streams equal to the number of fuel nozzles for each combustor 16 (only one of which is shown in FIG. 2). As described herein, when turbine engine 10 is operating on gaseous fuel, liquid fuel supply system 12 remains charged so that it is readily available for any liquid fuel 14 transfer request. Components of liquid fuel supply system 12 sit idle while both control valve 112 and stop valve 108 remain seated in a closed position. Purge air 116, which is pressurized to a higher pressure than the static liquid fuel supply system 12 pressure during gaseous fuel operation, actuates a three-way valve 118 associated with each combustor 16 so that liquid fuel 14 cannot enter the respective combustor 16. In some embodiments, purge air 116 can seep past seals (not shown) in three-way valve 118, interact with liquid fuel 14, and promote coking even the purge air is typically cooled to low temperature.

During gaseous fuel operation of turbine engine 10, liquid fuel 14 is charged up to three-way valve 118. Liquid fuel lines 120 downstream of three-way valve 118 are purged with purge air 116 until purge air 116 replaces liquid fuel 14 in liquid fuel lines 120. In some embodiments, liquid fuel 14 in liquid fuel supply system 12 can remain stagnant for long periods, for example, and without limitation, in some instances up to approximately six months or longer. During this stagnant period, a temperature of liquid fuel 14 in liquid fuel supply system 12 can reach or exceed temperatures of about 350 degrees Fahrenheit (° F.) (177 degree Celsius (° C.)) due to its proximity to combustors 16. As a result of the increased temperature and stagnation period, carbonaceous deposits (i.e., coke) can form, for example, in three-way valve 118 and liquid fuel lines 120 and 122 of liquid fuel supply system 12. Liquid fuel 14 residue can exist on the surfaces of liquid fuel lines 120 after the purge air 116 purge operation. In addition, purge air 116 can enter liquid fuel lines 122 through three-way valve 118. During gaseous fuel operation of turbine engine 10, liquid fuel 14 is present upstream of three-way valve 118. As liquid fuel 14 is heated by the temperatures of the surrounding combustors 16, the liquid fuel expands and may leak through three-way valve 118 into liquid fuel lines 120 downstream of three-way valve 118. This liquid fuel 14 mixes with purge air 116 and hot metal surfaces of the liquid fuel lines 120 and coking occurs.

In the exemplary embodiment, fuel additive injection system 100 is coupled in fluid communication with liquid fuel supply system 12, and includes a recirculation circuit 126 for recirculating a portion of liquid fuel 14 in a portion of liquid fuel supply system 12. Fuel additive injection system 100 is configured to channel chemical additive 15 (shown in FIG. 1) with liquid fuel 14 through recirculation circuit 126 to facilitate inhibiting coking in liquid fuel supply system 12. Fuel additive injection system 100 includes chemical additive source 102 configured to contain chemical additive 15. Chemical additive source 102 can have any size and shape configured to hold a desired amount of chemical additive 15, and depends in part on a size of, and a liquid fuel 14 flowrate through, liquid fuel supply system 12.

In the exemplary embodiment, a chemical additive injection device 124 is coupled in flow communication with chemical additive source 102. Chemical additive injection device 124 is configured to mix liquid fuel 14 of liquid fuel supply system 12 with chemical additive 15 and channel the additive fuel mixture back to liquid fuel supply system 12 via a fluid line 136. In the exemplary embodiment, chemical additive injection device 124 is an ejector, which effectively eliminates the need to dissipate liquid fuel 14 pressure across an orifice or similar device in recirculation circuit 126. The ejector enables mixing of liquid fuel 14 from liquid fuel supply system 12 and chemical additive 15 from a fluid line 128 to adjust chemical additive extraction flows to facilitate reducing coking. In alternative embodiments, chemical additive injection device 124 includes, for example, and without limitation, a positive displacement pump, a centrifugal pump, and/or any other fluid moving device that enables fuel additive injection system 100 to function as described herein.

An ejector is a mechanical device with no moving parts or required external energy input that mixes two fluid streams based on a transfer of momentum. In the exemplary embodiment, the ejector (i.e., additive injection device 124) has an inlet 130 for the high pressure liquid fuel 14 (i.e., the motive fluid) received via recirculation circuit 126 via a fluid line 127, and an inlet 132 for the low pressure chemical additive 15 (i.e., suction fluid) received via fluid line 128. The ejector includes a primary nozzle (not shown) and a secondary nozzle (not shown). The secondary nozzle is configured for accelerating the low pressure chemical additive 15 to drop its static pressure, and the primary nozzle is configured to lower the static pressure of the high pressure liquid fuel 14 to a pressure below the total pressure of the low pressure chemical additive 15. By positioning the ejector in recirculation circuit 126, high pressure liquid fuel 14 flows from liquid fuel supply system 12 functions as the motive flow at inlet 130. The low pressure chemical additive 15 flow functions as the suction flow via inlet 132. Thus, the two flows are mixed together and flow through an outlet 134 of the ejector forming an additive fuel mixture that is channeled to liquid fuel supply system 12 via fluid line 136. It will be appreciated that the ejector, therefore, has no moving parts, therefore it makes the liquid fuel system more reliable.

In the exemplary embodiment, a chemical additive valve 138 or other similar flow control device is disposed between chemical additive source 102 and chemical additive injection device 124 to regulate a flow of chemical additive 15 to inlet 132. Chemical additive valve 138 includes, for example, and without limitation, a proportional valve, a solenoid valve, a servo valve, or any other type of fluid flow control valve that enables fuel additive injection system 100 to function as described herein.

In the exemplary embodiment, control valve 112 is a three-way valve and is disposed in fluid communication between a main liquid fuel line 140 of liquid fuel supply system 12 and chemical additive source 102. Control valve 112 is configured to regulate (i.e., permit or prevent) flow of liquid fuel 14 into recirculation circuit 126. More specifically, control valve 112 is configured to control the amount and/or rate at which liquid fuel 14 flows into recirculation circuit 126 of fuel additive injection system 100, thereby controlling the concentration of chemical additive 15 in liquid fuel 14. In some embodiment, control valve 112 includes, for example, and without limitation, a proportional three-way valve, a solenoid operated three-way valve, a servo three-way valve, or any other type of fluid flow control valve that enables f liquid fuel supply system 12 to function as described herein. In an exemplary embodiment, the fuel additive injection system 100 is in initial fluid communication with liquid fuel supply system 12 downstream of liquid fuel pump 110 and stop valve 108. Stop valve 108 controls flow of liquid fuel 14 to liquid fuel pump 110 and, ultimately, to combustors 16. In this location, a portion of liquid fuel 14 can be diverted and mixed (i.e., treated) with a desired amount of chemical additive 15 in the liquid fuel supply system 12 downstream of stop valve 108, and particularly to the piping and check valves downstream of stop valve 108, which are prone to coking.

Figure 3:
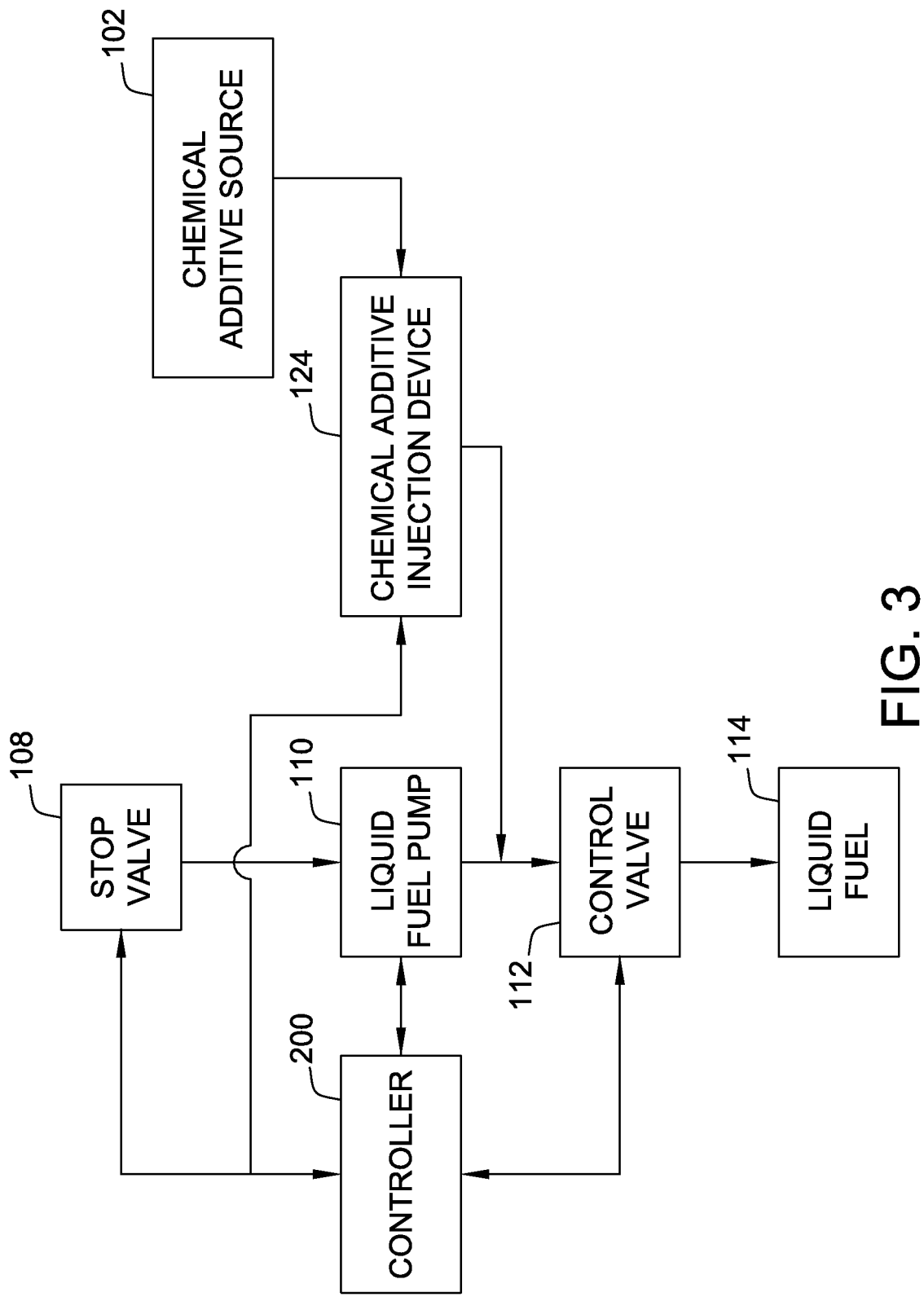
FIG. 3 is a schematic of a controller for use with turbine engine shown in FIG. 1.

FIG. 3 is a schematic of a controller 200 for use with turbine engine 10 (shown in FIG. 1). In the exemplary embodiment, controller 200 may be any controller that enables turbine engine 10 to function as described herein. Controller 200 is coupled in operative (e.g., electrical) communication to at least stop valve 108, liquid fuel pump 110, and control valve 112 of liquid fuel supply system 12. In addition, controller 200 is coupled in operative communication to chemical additive source 102, chemical additive injection device 124, and chemical additive valve 138 of fuel additive injection system 100. Through control of valves 108, 112, and 138, controller 200 can control the volume of liquid fuel 14 entering fuel additive injection system 100, and thereby, the chemical additive concentration of the additive fuel mixture.

Typically, it is more economical to operate turbine engine 10 on gaseous fuel; however, when operating on gaseous fuel, liquid fuel 14 is stagnant for extended periods in liquid fuel supply system 12, as described herein. Fortunately, to facilitate inhibiting and/or reducing coking in liquid fuel supply system 12, fuel additive injection system 100 is activated to supply chemical additive 15 to liquid fuel 14. For example, in a first operating condition, when turbine engine 10 is running on liquid fuel 14, controller 200 activates fuel additive injection system 100 immediately before shut down of liquid fuel 14 as turbine engine 10 is about to transfer to gaseous fuel. In this first operating condition, turbine engine 10 is typically operating at steady-state base load. Controller 200 at least partially opens control valve 112 to channel a portion of liquid fuel 14 flowing through liquid fuel supply system 12 through recirculation circuit 126 of fuel additive injection system 100. Liquid fuel 14 enters additive injection device 124, e.g. an ejector in the example embodiment, at inlet 130. Simultaneously to opening control valve 112, controller 200 also at least partially opens chemical additive valve 138 between chemical additive source 102 and additive injection device 124. As liquid fuel 14 is channeled through additive injection device 124, a portion of chemical additive 15 is drawn into additive injection device 124 and mixed with liquid fuel 14. The additive fuel mixture is channeled back to liquid fuel supply system 12. Controller 200 may operate liquid fuel pump 110 for a predetermined period to ensure that liquid fuel supply system 12 is filled with the additive fuel mixture up to three-way valve 118. As such, when three-way valve 118 is closed, and turbine engine 10 is operating on gaseous fuel, liquid fuel supply system 12 is charged with the additive fuel mixture to facilitate inhibiting and/or reducing coking in liquid fuel supply system 12. Just prior to or simultaneously with transition to gaseous fuel operation, controller 200 closes control valve 112 such that fuel additive injection system 100 is deactivated. Turbine engine 10 can then transition from liquid fuel 14 operation to gaseous fuel operation. As described herein, liquid fuel lines 120 are purged back to three-way valve 118 with purge air 116. Due to the fuel additive operation described above, liquid fuel 14 remaining in liquid fuel supply system 12 will be the additive fuel mixture. As the additive fuel mixture stagnates under higher pressures and temperatures caused by heat from combustors 16, chemical additive 15 in the additive fuel mixture facilitates inhibiting and/or reducing coking that would typically occur.

In the exemplary embodiment, the predetermined period required to effectively fill liquid fuel supply system 12 with the additive fuel mixture can vary and depends on several factors including, for example, and without limitation, cycle time, liquid fuel volume, liquid fuel line dimensions, and the like. As used herein, the phrase "cycle time" includes the time it takes the entire volume of the additive fuel mixture to travel from stop valve 108 to combustor 16. Typically, to one skilled in the art, this time is also referred to as "residence time." In the exemplary embodiment, the amount of chemical additive 15 mixed with liquid fuel 14 depends, at least in part, on the pressures and flow rate of liquid fuel channeled through recirculation circuit 126 and the flow rate of chemical additive 15 into additive injection device 124. These flow rates are determined by controller 200 based in part on the operating characteristics of turbine engine 10, the pressure of liquid fuel 14 in liquid fuel supply system 12, data stored in controller 200, and various other factors.

In a second operating condition of turbine engine 10, controller 200 activates fuel additive injection system 100 immediately after a "trip" and shut down of turbine engine 10. In this second operating condition, turbine engine 10 typically experiences a fault condition that causes an unscheduled and rapid shut down of turbine engine 10. Controller 200 closes stop valve 108 to prevent addition liquid fuel 14 from being supplied to combustors 16. Simultaneously, controller 200 at least partially opens control valve 112 to channel a portion of liquid fuel 14 flowing through liquid fuel supply system 12 through recirculation circuit 126 of fuel additive injection system 100. Liquid fuel 14 enters additive injection device 124, e.g. an ejector in the example embodiment, at inlet 130. Simultaneously to opening control valve 112, controller 200 also at least partially opens chemical additive valve 138 between chemical additive source 102 and additive injection device 124. Liquid fuel 14 is mixed with chemical additive 15, and the additive fuel mixture is channeled back to liquid fuel supply system 12. Controller 200 may operate liquid fuel pump 110 for a predetermined period to ensure that liquid fuel supply system 12 is filled with the additive fuel mixture up to combustor 16.

Similarly, in a third operating condition of turbine engine 10, controller 200 activates fuel additive injection system 100 during a typical shut down sequence of turbine engine 10. In this third operating condition, controller 200 activates fuel additive injection system 100 immediately before shut down of liquid fuel 14. Controller 200 at least partially opens control valve 112 to channel a portion of liquid fuel 14 flowing through liquid fuel supply system 12 through recirculation circuit 126 of fuel additive injection system 100. Liquid fuel 14 enters additive injection device 124, e.g. an ejector in the example embodiment, at inlet 130. Simultaneously to opening control valve 112, controller 200 also at least partially opens chemical additive valve 138 between chemical additive source 102 and additive injection device 124. Liquid fuel 14 is mixed with chemical additive 15, and the additive fuel mixture is channeled back to liquid fuel supply system 12. Controller 200 may operate liquid fuel pump 110 for a predetermined period to ensure that liquid fuel supply system 12 is filled with the additive fuel mixture up to combustor 16. Controller 200 then closes stop valve 108 to prevent addition liquid fuel 14 from being supplied to combustors 16.

In the exemplary embodiment, example chemical additive 15 mixtures include any composition configured to inhibit and/or reduce coking in liquid fuel supply system 12. Chemical additive 15 is configured to be effective at temperatures experienced by liquid fuel 14 in liquid fuel supply system 12. For example, and without limitation, in one embodiment, chemical additive 15 is effective at inhibiting coking in stagnant liquid fuel 14 at a temperature in the range between and including about 200° F. (93° C.) to about 400° F. (204° C.).

Typically, a combination of four different elements leads to coking in liquid fuel supply system 12. These include, for example, residence time, temperature, presence of oxygen, and presence of metal. Avoiding these components is difficult in turbine engine 10, and as such, chemical additive 15 is configured to function as a barrier between liquid fuel 14 and the oxygen and metal in liquid fuel supply system 12. As described herein, chemical additive 15 (e.g., an anti-fouling or an anti-coking agent) includes, for example, and without limitation, a mixture of at least one of an antioxidant, a polymer inhibitor, and/or a metal deactivator. Each of these three components has a particular effect on the coke causing elements in liquid fuel supply system 12. The particular composition of the components chosen and the amounts in which they are present in chemical additive 15 will depend on the conditions and factors influencing coke formation in liquid fuel supply system 12, for example, and without limitation, liquid fuel supply line dimensions, liquid fuel type, average system temperatures and pressures, and the like. The components can be mixed to produce chemical additive 15 in any manner known to those having skill in the art. In an exemplary embodiment, chemical additive 15 is a liquid at standard liquid fuel supply system 12 temperatures and will be mixable with liquid fuel 14. In some cases, it may be necessary to dissolve one or more of the components in a solvent for the purpose of providing a chemical additive 15 mixable with liquid fuel 14.

In one example embodiment, the antioxidant component of chemical additive 15 is any antioxidant composition configured to inhibit the effect of oxygen on liquid fuel 14 present in liquid fuel supply system 12. The antioxidant component can include a single antioxidant composition or a combination of antioxidants. The polymer inhibitor component of chemical additive 15 is any polymer inhibitor composition configured to inhibit the effect of the high temperature and hot air on liquid fuel 14. The polymer inhibitor inhibits oxygen and temperature based polymerization of hydrocarbons in liquid fuel 14. The polymer inhibitor component includes a single polymer inhibitor composition or a combination of inhibitors. In addition, the metal deactivator component of chemical additive 15 includes any metal deactivator composition configured to prevent the reaction between the metal lines of liquid fuel supply system 12 and metal valve surfaces with liquid fuel 14 and oxygen. The metal deactivators are configured to deactivate the metal that would otherwise catalyze polymerization of impurities in liquid fuel 14. The metal deactivator component includes a single metal deactivator composition or a combination of deactivators.

Figure 4:
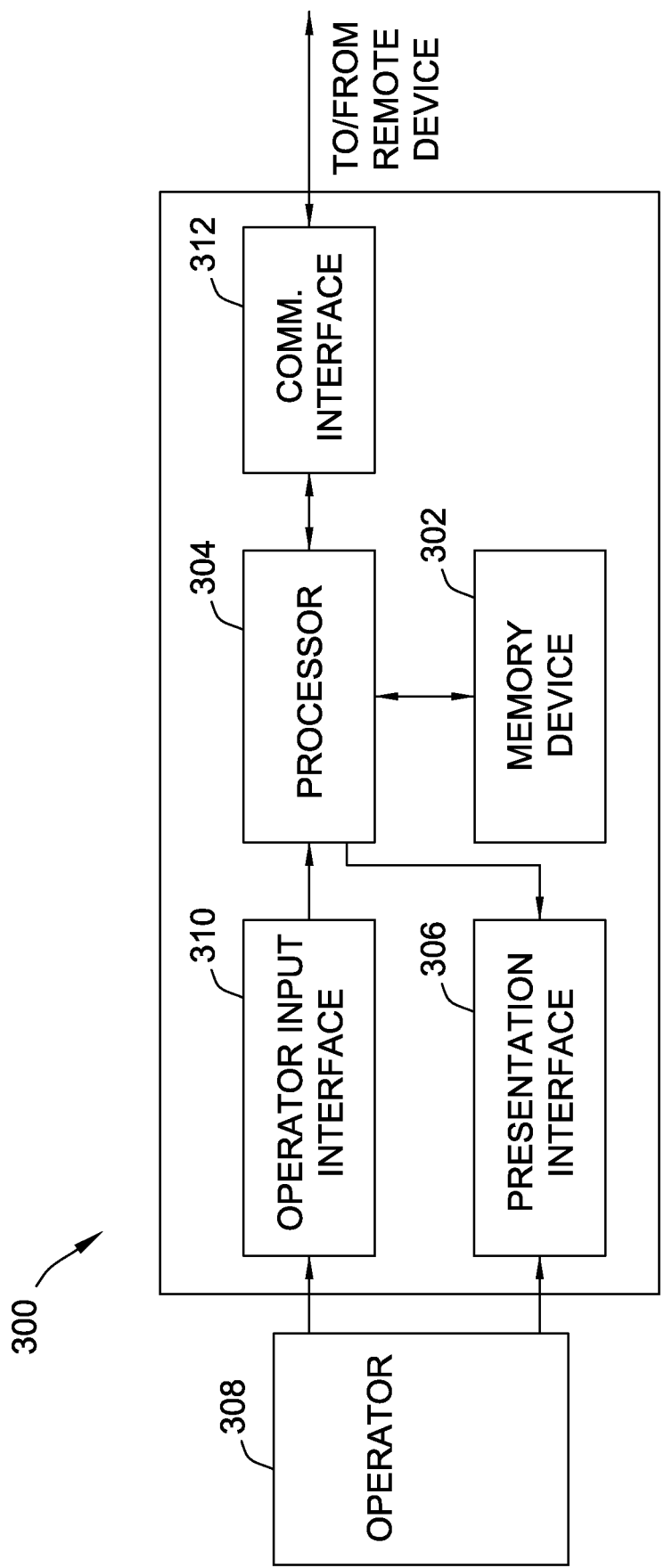
FIG. 4 is a block diagram of a computing device suitable for use with the turbine engine shown in FIG. 1, for example, as the controller or as a part of the controller shown in FIG. 3.

FIG. 4 is a block diagram of a computing device 300 suitable for use with turbine engine 10 (shown in FIG. 1), for example, as controller 200 or as a part of controller 200. In the exemplary embodiment, computing device 300 includes a memory device 302 and a processor 304 coupled to memory device 302. Processor 304 may include one or more processing units, such as, without limitation, a multi-core configuration. In the exemplary embodiment, processor 304 includes a field programmable gate array (FPGA). In other embodiments, processor 304 may include any type of processor that enables computing device 300 to function as described herein. In some embodiments, executable instructions are stored in memory device 302. Computing device 300 is configurable to perform one or more executable instructions described herein by programming processor 304. For example, processor 304 may be programmed by encoding an operation as one or more executable instructions and providing the executable instructions in memory device 302. In the exemplary embodiment, memory device 302 is one or more devices that enable storage and retrieval of information such as, without limitation, executable instructions or other data. Memory device 302 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, computing device 300 includes a presentation interface 306 coupled to processor 304. Presentation interface 306 presents information, such as, without limitation, the operating conditions of turbine engine 10, to an operator 308. In one embodiment, presentation interface 306 includes for example, without limitation, a monitor mounted, e.g., a cathode ray tube (CRT), a liquid crystal display (LCD), an organic LED (OLED) display, or an "electronic ink" display. In some embodiments, presentation interface 306 includes one or more display devices. In addition, or alternatively, presentation interface 306 includes an audio output device (not shown), for example, without limitation, an audio adapter or a speaker (not shown).

In some embodiments, computing device 300 includes an operator input interface 310. In the exemplary embodiment, operator input interface 310 is coupled to processor 304 and receives input from operator 308. Operator input interface 310 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 306 and operator input interface 310.

In the exemplary embodiment, a communication interface 312 is coupled to processor 304 and is configured to be coupled in communication with one or more other devices, such as, valves 108, 112, and 138 and controller 200, and to perform input and output operations with respect to such devices while performing as an input channel. For example, communication interface 312 may include, without limitation, a wired network adapter, a wireless network adapter, a mobile telecommunications adapter, a serial communication adapter, or a parallel communication adapter. Communication interface 312 may receive a data signal from or transmit a data signal to one or more remote devices.

Presentation interface 306 and communication interface 312 are both capable of providing information suitable for use with the methods described herein, such as, without limitation, providing information to operator 308 or processor 304. Accordingly, presentation interface 306 and communication interface 312 may be referred to as output devices. Similarly, operator input interface 310 and communication interface 312 are capable of receiving information suitable for use with the methods described herein and may be referred to as input devices.

Exemplary embodiments of a fuel additive injection system for injecting a chemical additive into the liquid fuel supply system are described herein. The embodiments include a controller and a recirculation circuit configured to mix a chemical additive with a liquid fuel during certain operating conditions of the turbine engine. A chemical additive injection device is configured to receive a portion of liquid fuel and mix it with a chemical additive to generate an additive fuel mixture. The additive fuel mixture is channeled back to the liquid fuel supply system to facilitate inhibiting and/or reducing coking of the liquid fuel. The fuel additive injection system is part of the control sequence of the turbine engine and can be used to treat the liquid fuel during specific operation condition of the turbine engine, such as during transition to gaseous fuel, during shut down of the turbine engine, and during an emergency trip of the turbine engine. The fuel additive injection system can advantageously inhibit coking in the fuel system of turbine engine 10. Inhibition of coking facilitates increase the life span, efficiency, and production of the turbine engine. By mixing the chemical additive with the liquid fuel, the fuel additive injection system can substantially inhibit or even prevent the formation of coke caused by the combined presence of stagnant fuel, air, heat, and metal in the liquid fuel supply system. The fuel additive injection system, therefore, can improve the efficiency and reliability of the turbine engine. Therefore, the operating and maintenance costs of a turbine system can be significantly reduced through use of the fuel additive injection system. Moreover, the fuel additive injection system described herein can be utilized with new or existing turbine engines, and the system can be implemented with only minor modification.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the scope of the disclosure. For example, components of each system and/or steps of each method may be used and/or practiced independently and separately from other components and/or steps described herein. Additionally, while various embodiments of the disclosure have been described, it is to be understood that aspects of the disclosure may include only some of the described embodiments, and that each component and/or step may also be used and/or practiced with other systems and methods. Accordingly, the disclosure is not to be seen as limited by the foregoing description, but is only limited by the scope of the appended claims.

Although specific features of various embodiments of the disclosure may be shown in some drawings and not in others, this is for convenience only. Moreover, references to "one embodiment" or "an embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A method for inhibiting coke formation in a gas turbine, the gas turbine comprising at least one combustor configured to combust liquid fuel, a liquid fuel supply system comprising at least one fuel line in flow communication with said at least one combustor, the gas turbine further comprising a chemical additive source configured to provide a chemical additive for mixing with the liquid fuel to form an additive fuel mixture configured to inhibit coke formation in said liquid fuel supply system, the chemical additive including an antioxidant, a polymer inhibitor, or a metal deactivator, the gas turbine further comprising a fuel additive injection system comprising a recirculation circuit coupled with said at least one fuel line at a first location, an ejector coupled in fluid communication with said recirculation circuit, and a fluid line coupled between an outlet of said ejector and said at least one fuel line at a second location upstream from said first location, said fuel additive injection system configured to channel the chemical additive for mixing with a portion of liquid fuel within said ejector to generate the additive fuel mixture, the recirculation circuit configured to recirculate at least a portion of the additive fuel mixture discharged from said ejector to said at least one fuel line, the gas turbine further comprising a purge valve coupled to said at least one fuel line between said at least one combustor and said first location such that a first fuel line is defined between said purge valve and said at least one combustor, and a second fuel line is defined between said purge valve and said first location, wherein said purge valve is configured to block fluid flow between said first and second fuel lines such that the additive fuel mixture remains charged within the second fuel line, said gas turbine further comprising a purge air source in flow communication with said purge valve, said purge air source configured to provide purge air for purging said first fuel line of liquid fuel or the additive fuel mixture, said method comprising:

channeling a flow of the portion of liquid fuel through a control valve positioned in the at least one fuel line of the liquid fuel supply system into the ejector, the control valve located downstream of a stop valve, the stop valve positioned on the at least one fuel line;

channeling a flow of the chemical additive through a chemical additive valve into the ejector;

mixing the flow of the chemical additive with the flow of the portion of liquid fuel in the ejector to generate a flow of an additive fuel mixture configured to inhibit coke formation in the liquid fuel supply system; and channeling the flow of the additive fuel mixture into the at least one fuel line of the liquid fuel supply system at the second position, the control valve being downstream of the second position and the stop valve being upstream of the second position.

2. The method in accordance with claim 1, wherein channeling the flow of the portion of liquid fuel through the control valve comprises controlling the control valve with a controller coupled to the control valve, the control valve including one of a proportional three-way valve, a solenoid operated three-way valve, or a servo three-way valve.

3. An apparatus for a turbine engine, the apparatus comprising:
at least one combustor configured to combust liquid fuel;
a liquid fuel supply system comprising at least one fuel line in flow communication with said at least one combustor, the liquid fuel supply system comprising:
a stop valve;
a liquid fuel pump coupled downstream from, and in fluid communication with, said stop valve, said liquid fuel pump configured to channel liquid through said liquid fuel supply system downstream of said stop valve; and
a control valve coupled downstream from, and in fluid communication with, said liquid fuel pump;
the apparatus further comprising:
a chemical additive source configured to provide a chemical additive, including an antioxidant, a polymer inhibitor, or a metal deactivator for mixing with the liquid fuel to form an additive fuel mixture configured to inhibit coke formation in said liquid fuel supply system;
a fuel additive injection system comprising a recirculation circuit coupled with said at least one fuel line at a first location, an ejector coupled in fluid communication with said recirculation circuit, and a fluid line of said recirculation circuit coupled between an outlet of said ejector and said at least one fuel line at a second location upstream from said first location, said fuel additive injection system configured to channel the chemical additive for mixing with a portion of liquid fuel within said ejector to generate the additive fuel mixture, the recirculation circuit configured to recirculate at least a portion of the additive fuel mixture discharged from said ejector to said at least one fuel line, said recirculation circuit coupled in flow communication with said control valve, wherein said stop valve and said liquid fuel pump are positioned on the at least one fuel line and the stop valve is in flow communication with the liquid fuel pump via the at least one fuel line;
a purge valve coupled to said at least one fuel line between said at least one combustor and said first location such that a first fuel line is defined between said purge valve and said at least one combustor, and a second fuel line is defined between said purge valve and said first location, wherein said purge valve is configured to block fluid flow between said first and second fuel lines such that the additive fuel mixture remains charged within the second fuel line; and a purge air source in flow communication with said purge valve, said purge air source configured to provide purge air for purging said first fuel line of liquid fuel or the additive fuel mixture.

4. The apparatus in accordance with claim 1, wherein said ejector comprises a first inlet connected to said at least one fuel line; and wherein a chemical additive valve is coupled in fluid communication between said chemical additive source and said ejector.

5. The apparatus in accordance with claim 4, wherein said control valve comprises a three-way control valve configured to channel the portion of liquid fuel to said first inlet for controlling a concentration of chemical additive in the additive fuel mixture.

6. The apparatus in accordance with claim 5, wherein said chemical additive valve is configured to channel chemical additive to a second inlet of said ejector.

7. The apparatus in accordance with claim 5, wherein said chemical additive valve is one of: a proportional three-way valve, a solenoid operated three-way valve, or a servo three-way valve.

8. The apparatus in accordance with claim 4, further comprising a controller coupled in operative communication with said control valve and said chemical additive valve, said controller configured to control said control valve and said chemical additive valve to channel liquid fuel and chemical additive to said ejector for generating the additive fuel mixture.

9. A turbine engine comprising:
at least one combustor configured to combust liquid fuel;
a liquid fuel supply system comprising at least one fuel line in flow communication with said at least one combustor;
a chemical additive source configured to provide a chemical additive, including an antioxidant, a polymer inhibitor, or a metal deactivator for mixing with the liquid fuel to form an additive fuel mixture configured to inhibit coke formation in said liquid fuel supply system;
a fuel additive injection system comprising a recirculation circuit coupled with said at least one fuel line at a first location, an ejector coupled in fluid communication with said recirculation circuit, and a fluid line of the recirculation circuit coupled between an outlet of said ejector and said at least one fuel line at a second location upstream from said first location, said fuel additive injection system configured to channel the chemical additive for mixing with a portion of liquid fuel within said ejector to generate the additive fuel mixture, the recirculation circuit configured to recirculate at least a portion of the additive fuel mixture discharged from said ejector to said at least one fuel line;
a purge valve coupled to said at least one fuel line between said at least one combustor and said first location such that a first fuel line is defined between said purge valve and said at least one combustor, and a second fuel line is defined between said purge valve and said first location, wherein said purge valve is configured to block fluid flow between said first and second fuel lines such that the additive fuel mixture remains charged within the second fuel line; and
a purge air source in flow communication with said purge valve, said purge air source configured to provide purge air for purging said first fuel line of liquid fuel or the additive fuel mixture.

10. The turbine engine in accordance with claim 9, wherein said fuel additive injection system further comprises
a chemical additive valve coupled in fluid communication between said chemical additive source and said ejector.

11. The turbine engine in accordance with claim 10, wherein said ejector receives the portion of liquid fuel at a first inlet, and the chemical additive at a second inlet.

12. The turbine engine in accordance with claim 9, wherein said liquid fuel supply system comprises a stop valve upstream of said fuel additive injection system, said stop valve configured to regulate a flow of liquid fuel to said at least one combustor.

13. The turbine engine in accordance with claim 12, further comprising a liquid fuel pump coupled downstream and in fluid communication with said stop valve, said liquid fuel pump configured to channel liquid fuel through said liquid fuel supply system downstream of said stop valve.

14. The turbine engine in accordance with claim 9, wherein said liquid fuel supply system comprises a control valve coupled to said fuel additive injection system, said control valve configured to regulate a flow rate of liquid fuel to said recirculation circuit, thereby controlling a concentration of the chemical additive in the additive fuel mixture.

15. The turbine engine in accordance with claim 14, wherein said control valve comprises one of the following: a proportional three-way valve, a solenoid operated three-way valve, or a servo three-way valve.

16. The turbine engine in accordance with claim 9 further comprising a controller coupled in operative communication with said liquid fuel supply system and said fuel additive injection system, wherein said controller is configured to control operation of said fuel additive injection system.

17. The turbine engine in accordance with claim 9, wherein said purge air source is configured to provide the purge air at a pressure greater than a static pressure of the additive fuel mixture in the second fuel line.

18. The turbine engine in accordance with claim 17, wherein said purge valve is actuatable by the purge air pressure to restrict flow of the additive fuel mixture through said purge valve and towards said at least one combustor.

* * * * *